United States Patent
Park et al.

(10) Patent No.: US 8,964,702 B1
(45) Date of Patent: Feb. 24, 2015

(54) CONTROLLING WIRELESS DEVICE COMMUNICATION

(71) Applicant: Sprint Spectrum LP, Overland Park, KS (US)

(72) Inventors: Sungki Park, Ashburn, VA (US); Saied Kazeminejad, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 279 days.

(21) Appl. No.: 13/679,968

(22) Filed: Nov. 16, 2012

(51) Int. Cl.
*H04W 4/00* (2009.01)
*H04W 52/02* (2009.01)
*H04W 36/38* (2009.01)

(52) U.S. Cl.
CPC .......... *H04W 52/0212* (2013.01); *H04W 36/38* (2013.01)
USPC ........................................... 370/332; 370/331

(58) Field of Classification Search
USPC .................................................. 370/331, 332
See application file for complete search history.

(56) References Cited

U.S. PATENT DOCUMENTS

| | | | |
|---|---|---|---|
| 7,536,186 B2 | 5/2009 | Dorenbosch et al. | |
| 2005/0036462 A1 * | 2/2005 | Sillasto et al. | 370/331 |
| 2009/0059865 A1 * | 3/2009 | Zhang et al. | 370/331 |
| 2009/0253469 A1 | 10/2009 | Herczog | |
| 2010/0330996 A1 * | 12/2010 | Svedevall et al. | 455/436 |

* cited by examiner

*Primary Examiner* — Kenny Lin

(57) ABSTRACT

In systems and methods of controlling wireless device communication, a first request is received for a performance of a handover of a wireless device from a first access node shared by a first network operator and a second network operator to a second access node controlled only by the second network operator. A rejection response is sent preventing the performance of the handover, and a handover prevention value is set to prevent the sending of a second request for the performance of a handover of the wireless device from the first access node to the second access node.

18 Claims, 6 Drawing Sheets

CONTROLLING WIRELESS DEVICE COMMUNICATION

TECHNICAL BACKGROUND

A wireless communication network includes a plurality of access points or access nodes. An access node can be shared by two or more network operators, or an access node can be controlled by a single network operator, for example, as a dedicated access node.

A wireless device of a first network operator can detect signals from an access node controlled by a second network operator, and yet be denied access to the network through the access node controlled by the second network operator. For example, a wireless device of the first network operator can be in communication with a first access node under the shared control of a first network operator and a second network operator, and can detect a carrier signal from a second access node under the control of only the second network operator. While the carrier signal may be strong enough for the second access node to be a candidate to provide communication to the wireless device, when the wireless device of the first network operator requests to perform a handover to the second access node, the wireless device may be denied access to a communication system through the second access node, for example, because the wireless device is not authorized to access a network of the second network operator. When the wireless device tries repeatedly to request a handover to the second access node, a battery level of the wireless device can be drained rapidly while the wireless device is denied access to the communication network of the second network operator through the second access node.

Overview

In an embodiment, a first request is received for a performance of a handover of a wireless device from a first access node shared by a first network operator and a second network operator to a second access node controlled only by the second network operator. A rejection response is sent preventing the execution of the handover, and a handover prevention value is set to prevent the sending of a second request for the performance of a handover of the wireless device from the first access node to the second access node.

DETAILED DESCRIPTION

In an embodiment, a first request is received for a performance of a handover of a wireless device from a first access node, shared by a first network operator and a second network operator, to a second access node controlled only by the second network operator. A rejection response is sent preventing the performance of the handover, and a handover prevention value is set to prevent the sending of a second request for the performance of a handover of the wireless device from the first access node to the second access node. In an embodiment, a first signal strength threshold and a second signal strength threshold are set to prevent the wireless device from scanning a carrier of the second access node when a signal strength of a carrier of the first access node meets the first threshold. The wireless device is permitted to scan a carrier of the second access node and is prevented from performing a handover from the first access node to the second access node when a signal strength of the carrier of the first access node is below the first threshold and above the second threshold; when a signal strength of the carrier of the first access node meets the second threshold, the wireless device is permitted to scan a carrier of the second access node and to request a performance of a handover of the wireless device from the first access node to the second access node.

Figure 1:
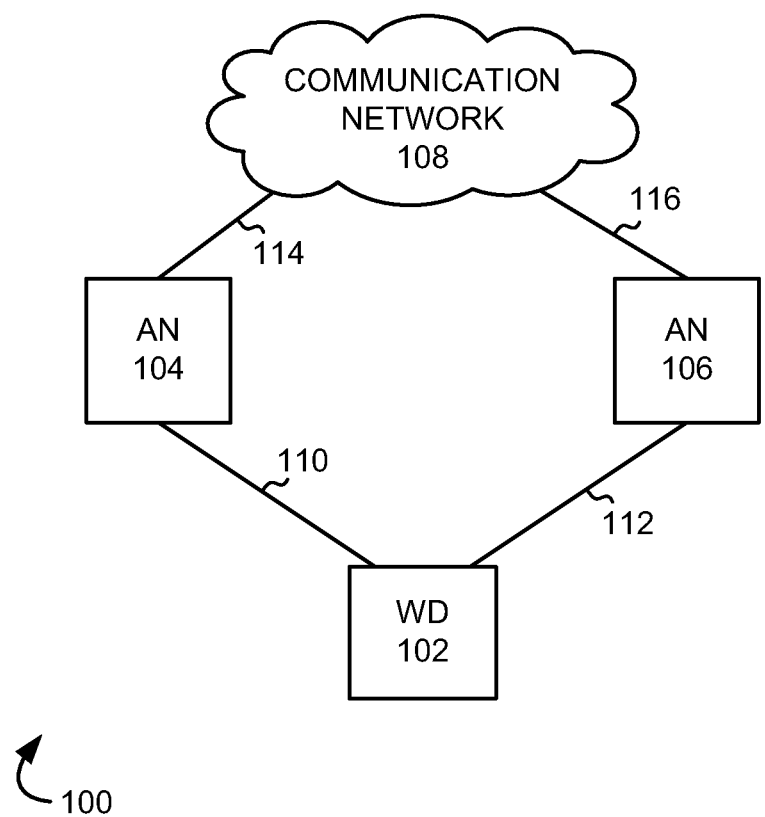
FIG. 1 illustrates an exemplary communication system to control wireless device communication.

FIG. 1 illustrates an exemplary communication system 100 to control wireless device communication comprising wireless device 102, access node 104, access node 106, and communication network 108. Examples of wireless device 102 can include a cell phone, a smart phone, a computing platform such as a laptop, palmtop, or tablet, a personal digital assistant, or an internet access device, including combinations thereof. Wireless device 102 can be capable of communicating over more than one carrier, such as a multi-mode wireless device. Wireless device 102 can communicate with access nodes 104 and 106 over communication links 110 and 112, respectively.

Access nodes 104 and 106 are network nodes capable of providing wireless communications to wireless device 102, and can be, for example, a base transceiver station, a radio base station, an eNodeB device, or an enhanced eNodeB device. Access nodes 104 and 106 can be under the control of one or more network operators, and each may be in communication with a network element of communication network 108 which provides instructions to an access node, such as a call controller or communication controller (for example, a mobility management entity (MME) or a mobile switching center (MSC)). Access nodes 104 and 106 are in communication with communication network 108 over communication links 114 and 116, respectively.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 110, 112, 114, and 116 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 104 and 106 and communication network 108 which are omitted for clarity, including additional processing nodes, routers, gateways, and physical and/or wireless data links for carrying data among the various network elements.

In an embodiment, a first request is received for a performance of a handover of wireless device 102 from access node 104, which is shared by a first network operator and a second network operator, to access node 106, which is controlled only by the second network operator. A rejection response is sent to wireless device 102 preventing the performance of the handover, and a handover prevention value is set to prevent wireless device 102 from sending a second request for the performance of a handover of the wireless device from access node 104 to access node 106.

Figure 2:
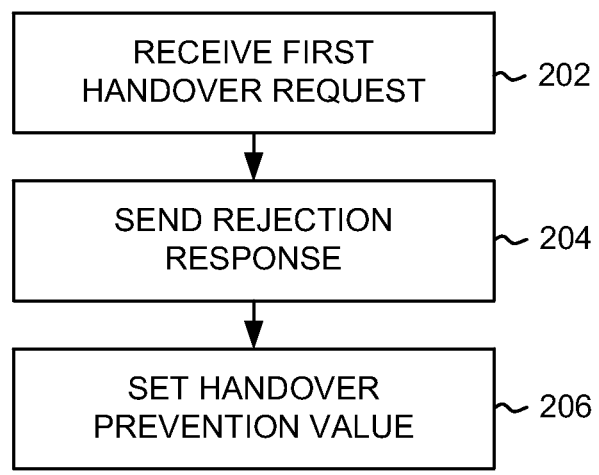
FIG. 2 illustrates an exemplary method of controlling wireless device communication.

FIG. 2 illustrates exemplary method of controlling wireless device communication. In operation 202, a first handover request is received from a wireless device. For example, wireless device 102 can be in communication with access node 104. Access node 104 can be, for example, under the control of a first network operator and a second network operator. Wireless device 102 can also detect a signal from access node 106, such as a pilot signal, carrier signal, and the like. When a signal from access node 106 meets a threshold, wireless device 102 can request the performance of a handover of wireless device 102 from access node 104 to access node 106. For example, wireless device 102 can detect a received signal strength indicator (RSSI), or a carrier plus interference to noise ratio (CNIR), which meets a threshold, and wireless device 102 can request (or communication system 100 can instruct wireless device 102 to request) that a handover be performed to hand over wireless device 102 from access node 104 to access node 106.

In operation 204, a rejection response can be sent preventing the performance of the handover. For example, access node 106 can be under the control of only the second network operator. While the signal from access node 106 may meet a threshold such that wireless device 102 requests that a handover be performed, network access through access node 106 can be denied to wireless device 102. For example, wireless device 102 may be authorized only by the first network operator, and thus can access a communication network only through access node 104. The handover request from wireless device 102 can thus be rejected even though the signal from access node 106 meets the threshold. In such case, a rejection response will be received preventing the performance of the handover. The rejection response can be received by access node 104 as well as by wireless device 102.

When the signal from access node 106 meets a threshold, wireless device 102 may make a second request that a handover be performed to hand over wireless device 102 to access mode. In the case where wireless device 102 is authorized only by the first network operator, the second handover request can also be rejected even though the signal from access node 106 meets the threshold. Thus wireless device 102 may make repeated requests for the performance of a handover which can be denied, which may increase use of network resources, and can drain power from a battery of wireless device 102 unnecessarily.

In operation 206, a handover prevention value is set to prevent the sending of a second request for the performance of a handover of the wireless device from the first access node to the second access node. For example, a handover prevention value can be set to prevent wireless device 102 from sending a second request that a handover be performed to hand over wireless device 102 from access node 104 to access node 106.

Figure 3:
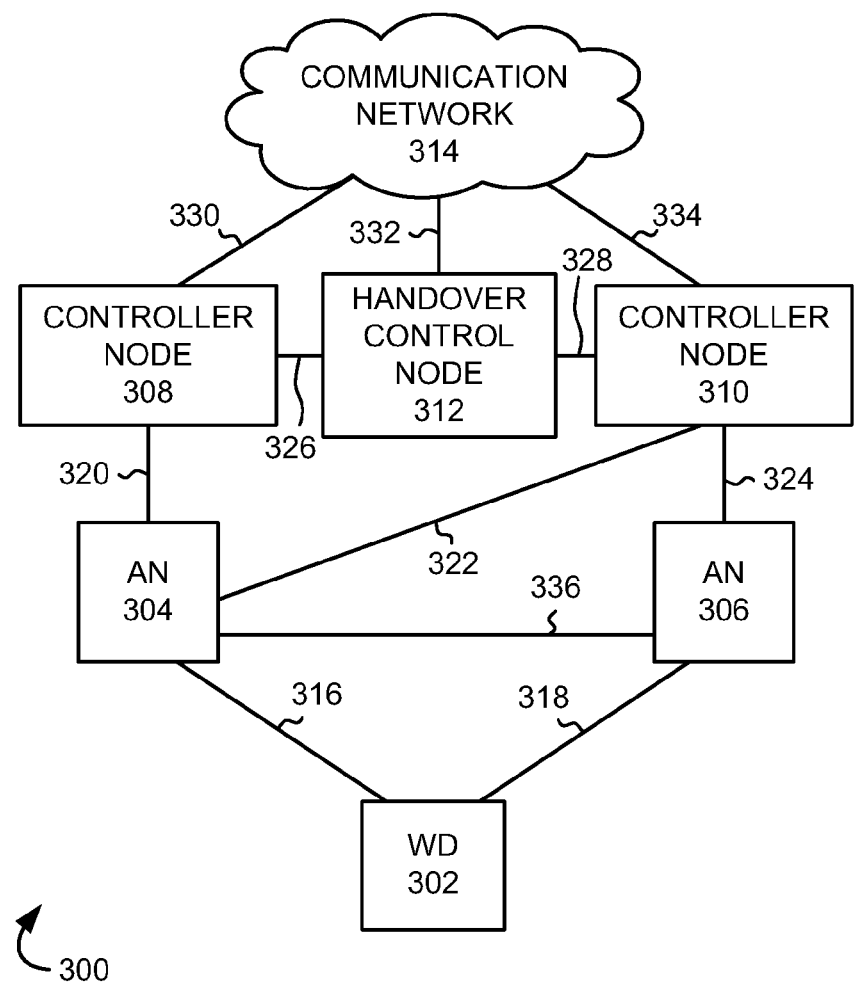
FIG. 3 illustrates another exemplary communication system to control wireless device communication.

FIG. 3 illustrates another exemplary communication system 300 to control wireless device communication comprising wireless device 302, access nodes 304 and 306, controller nodes 308 and 310, handover control node 312, and communication network 314. Examples of wireless device 302 can include a cell phone, a smart phone, a computing platform such as a laptop, palmtop, or tablet, a personal digital assistant, or an internet access device, including combinations thereof. Wireless device 302 can be capable of communicating over more than one carrier, such as a multi-mode wireless device. Wireless device 302 can communicate with access nodes 304 and 306 over communication links 316 and 318, respectively.

Access nodes 304 and 306 are network nodes capable of providing wireless communications to wireless device 302, and can be, for example, a base transceiver station, a radio base station, an eNodeB device, or an enhanced eNodeB device. Access nodes 304 and 306 can communicate with each other over communication link 336. Access node 304 is in communication with controller node 308 over communication link 320 and with controller node 310 over communication link 322. Access node 306 is in communication with controller node 310 over communication link 324. Controller nodes 308 and 310 can provide instructions to an access node, and can be, for example, a call controller or communication controller such as a mobility management entity (MME) or a mobile switching center (MSC). Controller nodes 308 and 310 are in communication with communication network 314 over communication links 328 and 332, respectively.

Access nodes 304 and 306 can be under the control of one or more network operators. For example, controller node 308 and controller node 310 can each be under the control of a different network operator. Access node 304 can be controlled by controller nodes 308 and 310, and thus can be shared by or under the control of two network operators. In contrast, access node 306 is only in communication with controller node 310, and thus can be under the control of one network operator through controller node 310.

Handover control node 312 is in communication with controller nodes 308 and 310 over communication links 326 and 328, respectively, and with communication network 314 over communication link 332. Handover control node 312 can comprise a processor and associated circuitry to execute or direct the execution of computer-readable instructions to control wireless device communication. Handover control node 312 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Handover control node 312 can comprise a standalone network element, or the functionality of handover control node 312 can be included in another network element, such as a gateway, a proxy node, controller node 308 and/or 310, or another network element.

Communication network 314 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 314 may also comprise base stations, wireless communication nodes, telephony switches, internet routers, network gateways, computer systems, communication links, or some other type of communication equipment, and combinations thereof. Communication network 314 can employ one or more wireless and/or wired communication protocols, analogous to communication network 108.

Communication links 316, 318, 320, 322, 324, 326, 328, 330, 332 and 334 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 304 and 306, controller nodes 308 and 310, handover control node 312, and communication network 314 which are omitted for clarity, including additional processing nodes, routers, gateways, and physical and/or wireless data links for carrying data among the various network elements.

Figure 4:
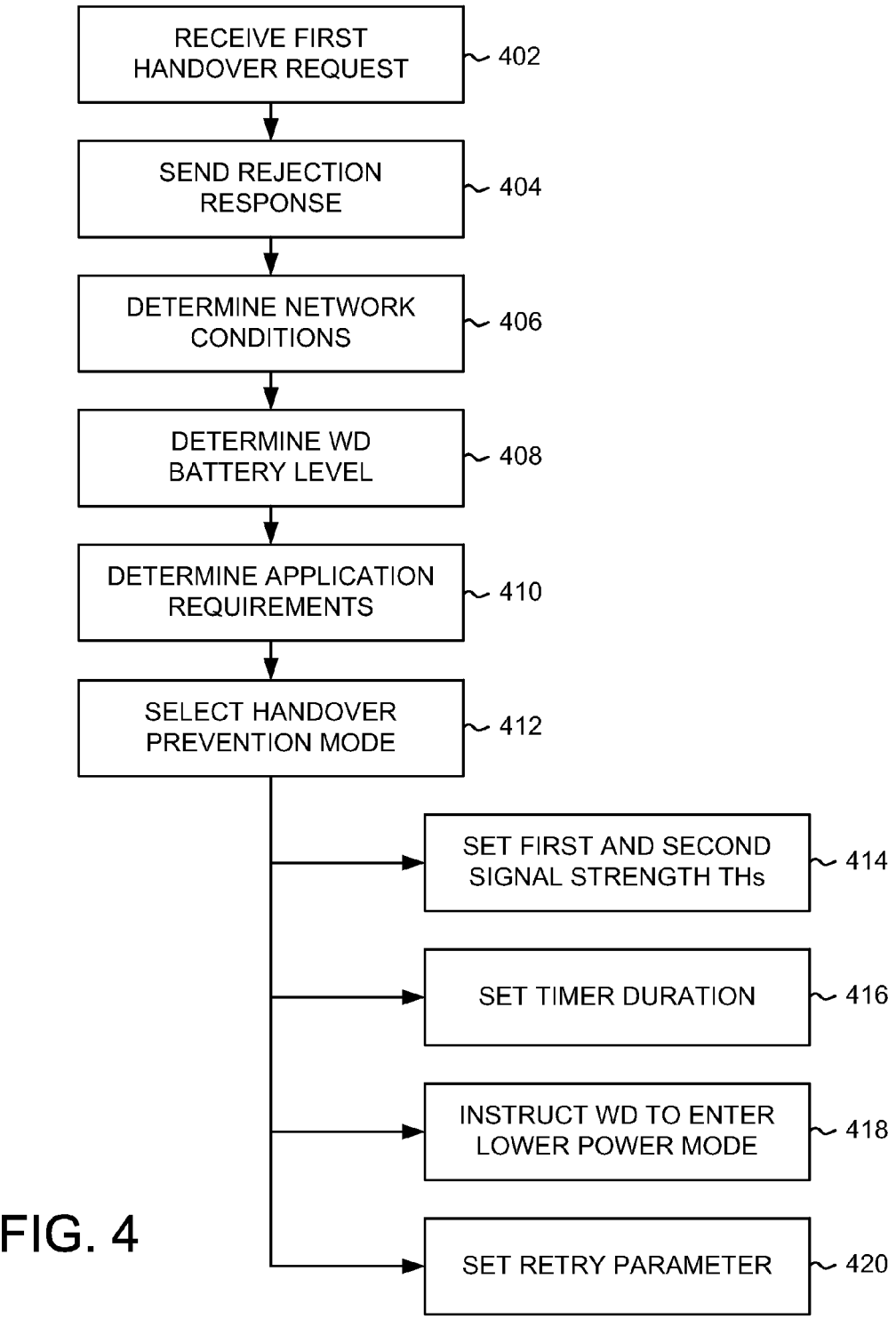
FIG. 4 illustrates another exemplary method of controlling wireless device communication

FIG. 4 illustrates another exemplary method of controlling wireless device communication. In operation 402, a first handover request is received from a wireless device. For example, wireless device 302 can be in communication with access node 304, which can be under the control of a first network operator and a second network operator through controller nodes 308 and 310, respectively. Wireless device 302 can detect a signal from access node 306, for example, a pilot signal, carrier signal, and the like. When the signal from access node 306 meets a threshold, wireless device 302 can request that a handover be performed to hand over wireless device 302 from access node 304 to access node 306. For example, wireless device 302 can detect from access node 306 a received signal strength indicator (RSSI), or a carrier plus interference to noise ratio (CNIR), which meets a threshold. As another example, wireless device 302 can detect a reference signal received power (RSRP) or a reference signal received quality (RSRQ). In an embodiment, wireless device 302 can request that a handover be performed to hand over wireless device 302 from access node 304 to access node 306. In an embodiment, communication system 300 can instruct wireless device 302 to request that a handover be performed to hand over wireless device 302 from access node 304 to access node 306. The first handover request can be received at handover control node 312, as well as at controller node 308 and/or 310.

In operation 404, a rejection response can be sent preventing the performance of the handover. For example, access node 306 can be under the control of only the second network operator through controller node 310. While the signal from access node 306 may meet a threshold such that wireless device 302 requests that a handover be performed, network access through access node 306 can be denied to wireless device 302, for example, because wireless device 302 may be authorized only by the first network operator, and thus can access a communication network only through access node 304. The handover request from wireless device 302 can thus be rejected even though the signal from access node 306 meets the threshold. In such case, a rejection response will be sent preventing the performance of the handover. The rejection response can be determined by handover control node 312.

In operation 406, network conditions are determined. For example, a network congestion metric can be determined for communication link 316 and/or communication link 318. A network congestion metric can also be determined for communication link 320, 322, and/or 324, as well as for communication link 330, 332, and/or 334, as well as other communication links in communication network 314. Network conditions can also include a determination of radio frequency conditions of communication link 316 and/or 318. In addition, in operation 408, a battery level of the wireless device can be determined. For example, a query can be sent to wireless device 302 to determine a battery level of wireless device 302, or wireless device 302 can provide a battery level, following the sending of the rejection response. Further, in operation 410, application requirements of an application running on the wireless device can be determined. For example, an application wireless device 302 can require data from communication network 314, and the application may have certain minimum data requirements. As an example, an application can be a delay sensitive application, such as a voice application (for example, a Voice over Internet Protocol application and the like) or a streaming data application (for example, streaming video or audio). A delay sensitive application can require a minimum effective data rate and/or can tolerate a maximum delay of data to meet a minimum performance threshold. Application requirements of the application can, for example, be provided by wireless device 302. Application requirements can also be determined, for example, by examining data from wireless device 302, one example of which is deep packet inspection of data from wireless device 302.

Based on the determined network conditions, the determined battery level, and/or the application requirements, a handover prevention mode can be selected (operation 412) to prevent wireless device 302 from repeatedly scanning a carrier of access node 306 and/or sending additional requests for the performance of handover of wireless device 302 from access node 304 to access node 306. In an embodiment, a network element, such as handover control node 312, can select a handover prevention mode, and accordingly can provide a handover prevention value to be sent to wireless device 302. In an embodiment, based at least in part on the rejection response, wireless device 302 can request a handover prevention value from communication network 300, and the handover prevention value can be provided by a network element such as handover control node 312. In an embodiment, handover control node 312 can provide at least two choices of a handover prevention mode to wireless device 302, which can respond with a selection of a handover prevention mode. Such selection by the wireless device can be made based at least in part on a battery level of wireless device 302, signal strength parameters determined from access node 304 and/or access node 306, and/or application requirements of an application running on wireless device 302.

Figure 5:
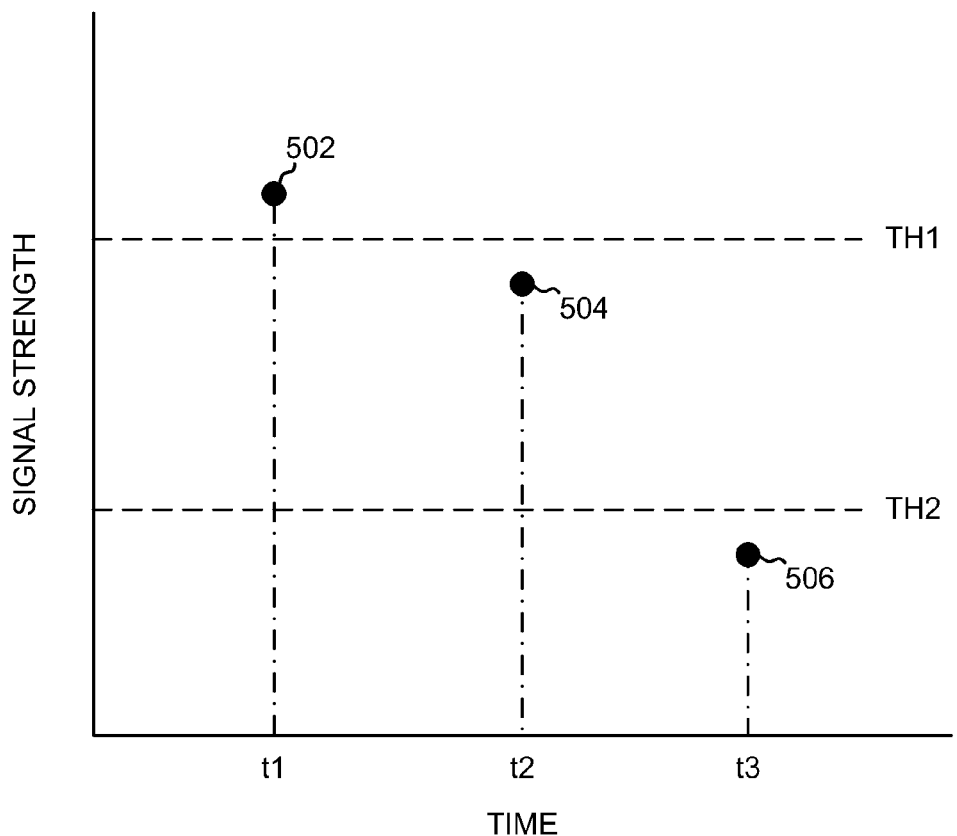
FIG. 5 illustrates exemplary signal strength thresholds.

In one handover prevention mode, first and second signal strength thresholds are set (operation 414). Referring to FIG. 5, first signal strength threshold TH1 and second signal strength threshold TH2 can be set. Thresholds TH1 and TH2 can be determined at least in part on a battery level of wireless device 302 and/or determined network conditions. A signal strength can comprise, for example, a received signal strength indicator (RSSI), or a carrier plus interference to noise ratio (CNIR), a reference signal received power (RSRP), a reference signal received quality (RSRQ), or the like.

When a signal strength of a carrier of second access node 304 meets threshold TH1 (for example signal strength 502, at time t1), wireless device 302 can be prevented from scanning a carrier of second access node 306, and can be prevented from attempting to access a carrier of second access node 306. For example, wireless device 302 may detect a signal strength of a carrier of access node 306 which is higher than a carrier signal strength of access node 304. In a case where wireless device 302 is, for example, unauthorized to access a communication system through access node 306, a request for a handover to access node 306 would be denied, and would thus be a waste of resources of both of wireless device 302 as well as of access node 306 and other network elements. In such case, wireless device 302 can be prevented (for example, by an instruction) from either scanning a carrier of access node 306, or from attempting to access a carrier of access node 306. In an embodiment, wireless device 302 can be instructed to stop scanning carriers, to prevent wireless device 302 from continually scanning a carrier of access node 306.

When a signal strength of the carrier of second access node 304 is below the first threshold TH1 and above the second threshold TH2 (for example, signal strength 504, a time t2), wireless device 302 can be permitted to scan carriers of access nodes. Wireless device 302 can also be prevented from requesting the performance of a handover of wireless device 302 from access node 304 to access node 306. For example, a signal strength between the first threshold and the second threshold can indicate a distance between wireless device 302 and access node 306. Where the signal strength decreases over time, the decrease can indicate that wireless device 302 may be moving away from access node 306. In such case, wireless device 302 can be prevented (for example, by an instruction) from requesting a handover to access node 306, but wireless device 302 can be permitted to scan carriers of detected access nodes. In an embodiment, wireless device 302 can also be instructed specifically not to scan a carrier of access node 306.

In addition, when a signal strength of the carrier of the second access node 304 meets the second threshold (for example, signal strength 506 at time t3), wireless device 302 can be permitted to scan a carrier of access nodes and to request a performance of a handover of the wireless device from access node 304 to another access node. For example, when a signal strength received from a carrier of access node 306 is below the second threshold TH2, it can be determined that wireless device 302 is sufficiently distant from access node 306 that it will neither continuously scan a carrier of access node 306 nor will wireless device 302 request to be handed over to access node 306. In an embodiment, wireless device 302 can also be instructed specifically not to scan a carrier of access node 306.

Returning to FIG. 4, in another handover prevention mode, a timer duration is set (operation 416). For example, a timer duration can be set to prevent wireless device 302 from scanning a carrier of access node 306 during the timer duration, such as from the time the timer duration is set until a future time. As another example, a timer duration can be set to prevent wireless device 302 from scanning a carrier of access node 306 and from requesting that a handover of wireless device 302 to second access node 306 be performed during the timer duration. As yet another example, a future timer duration can be set such that wireless device 302 can continue to scan a carrier of access node 306 until a future time, and from that future time wireless device 302 can be prevented from scanning and/or requesting that a handover be performed during the future timer duration. A timer duration and/or a future timer duration can be set. In an embodiment, the timer duration (and/or the future timer duration) can be determined based at least in part on a determined battery level of the wireless device, determined network conditions, and/or application requirements of an application running on wireless device 302. In an embodiment, the wireless device can request that a network element, such as handover control node 312, set the timer duration and/or future timer duration.

In another handover prevention mode, the wireless device can be instructed to enter a lower power mode (operation 418). For example, wireless device 302 can be instructed to enter into a lower power state, such as an idle mode or a sleep mode, in which the wireless device is not in continuous communication with an access node. In an embodiment, the wireless device can be instructed to enter the lower power mode for a predetermined period of time, which can be determined at least in part based on a battery level of the wireless device and/or determined network conditions. Additionally or alternatively, an instruction can be provided to the wireless device to leave the lower power state when, for example, the wireless device periodically checks for a pending paging message or the like.

In another handover prevention mode, a retry parameter is set (operation 420). For example, a retry parameter can be set so that a number of second handover requests sent by wireless device 302 can be limited. The retry parameter can be determined at least in part based on the determined battery level of the wireless device, the determined network conditions, and the determined application requirements of an application running on wireless device 302. In an embodiment, a network element such as handover control node 312 can determine the retry parameter and provide the retry parameter for wireless device 302. In an embodiment, wireless device 302 can request a retry parameter as its selection of a handover prevention mode.

Figure 6:
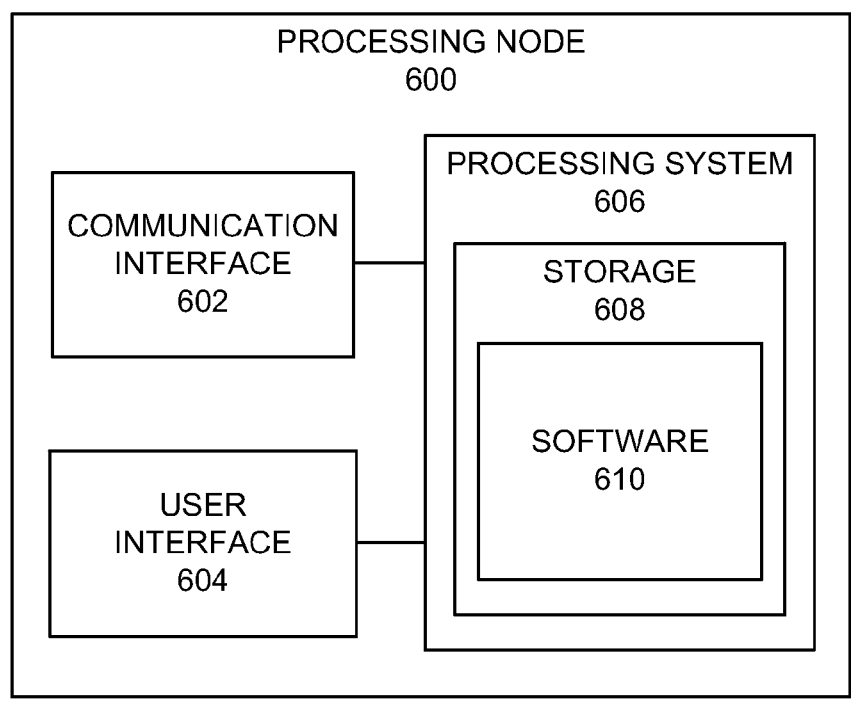
FIG. 6 illustrates an exemplary processing node.

FIG. 6 illustrates an exemplary processing node 600 comprising communication interface 602, user interface 604, and processing system 606 in communication with communication interface 602 and user interface 604. Processing node 600 is capable of controlling wireless device communication. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include handover control node 312, and processing node 600 can also be an adjunct or component of a network element, such as an element of controller node 308 and/or controller node 310, access nodes 104, 106, 304 or 306. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of controlling wireless device communication, comprising:
   receiving a first request for a performance of a handover of a wireless device from a first access node shared by a first network operator and a second network operator to a second access node controlled only by the second network operator;
   sending a rejection response preventing the performance of the handover; and
   setting a handover prevention value to prevent the sending of a second request for the performance of a handover of the wireless device from the first access node to the second access node.

2. The method of claim 1, wherein setting a handover prevention value further comprises:
   setting a first signal strength threshold and a second signal strength threshold;
   preventing the wireless device from scanning a carrier of the second access node when a signal strength of a carrier of the second access node meets the first threshold;
   scanning by the wireless device a carrier of the second access node and preventing a performance of a handover of the wireless device from the first access node to the second access node when a signal strength of the carrier of the second access node is below the first threshold and above the second threshold; and
   scanning by the wireless device a carrier of the second access node and requesting a performance of a handover of the wireless device from the first access node to the second access node when a signal strength of the carrier of the second access node meets the second threshold.

3. The method of claim 1, wherein setting a handover prevention value further comprises:
   sending a timer duration to the wireless device to prevent the wireless device from scanning a carrier of the second access node during the timer duration.

4. The method of claim 3, further comprising:
   sending a timer duration to the wireless device to prevent the wireless device from scanning a carrier of the second access node and from requesting that a handover of the wireless device to the second access node be performed during the timer duration.

5. The method of claim 1, wherein setting a handover prevention value further comprises:
   sending a future timer duration to the wireless device to prevent the wireless device from scanning a carrier of the second access node during the future timer duration.

6. The method of claim 5, wherein setting a handover prevention value further comprises:
   instructing the wireless device to stop scanning the carrier of the second access node at a future time; and
   sending the future timer duration to the wireless device to prevent the wireless device from scanning the carrier of the second access node during the future timer duration starting at the future time.

7. The method of claim 1, wherein setting a handover prevention value further comprises:
   instructing the wireless device to enter a lower power mode.

8. The method of claim 1, wherein setting a handover prevention value further comprises:
   sending a retry parameter to the wireless device to limit a number of requests for the performance of a handover of the wireless device from the first access node to the second access node to the retry parameter based on a battery level of the wireless device.

9. The method of claim 1, wherein setting a handover prevention value further comprises:
   receiving in response to the rejection response a request from the wireless device for a handover prevention value; and
   sending the handover prevention value to the wireless device to prevent the sending of a second request for the performance of a handover of the wireless device from the first access node to the second access node.

10. A system for controlling wireless device communication, comprising:
    a processing node configured to:
       receive a first request for a performance of a handover of a wireless device from a first access node shared by a first network operator and a second network operator to a second access node controlled only by the second network operator;
       send a rejection response preventing the performance of the handover; and set a handover prevention value to prevent the sending of a second request for the performance of a handover of the wireless device from the first access node to the second access node.

11. The system of claim 10, wherein the processing node is further configured to:
set a first signal strength threshold and a second signal strength threshold,
wherein the wireless device is prevented from scanning a carrier of the second access node when a signal strength of a carrier of the second access node meets the first threshold,
wherein when a signal strength of the carrier of the second access node is below the first threshold and above the second threshold the wireless device is permitted to scan a carrier of the second access node and a carrier of the first access node, and a performance of a handover of the wireless device from the first access node to the second access node is prevented, and
wherein when a signal strength of the carrier of the second access node meets the second threshold the wireless device is permitted to scan a carrier of the second access node and a carrier of the first access node, and to request a performance of a handover of the wireless device from the first access node.

12. The system of claim 10, wherein the processing node is further configured to:
send a timer duration to the wireless device to prevent the wireless device from scanning a carrier of the second access node during the timer duration.

13. The system of claim 12, wherein the processing node is further configured to:
send a timer duration to the wireless device to prevent the wireless device from scanning a carrier of the second access node and from requesting that a handover of the wireless device to the second access node be performed during the timer duration.

14. The system of claim 10, wherein the processing node is further configured to:
send a future timer duration to the wireless device to prevent the wireless device from scanning a carrier of the second access node during the future timer duration.

15. The system of claim 14, wherein the processing node is further configured to:
instruct the wireless device to stop scanning the carrier of the second access node at a future time; and
send the future timer duration to the wireless device to prevent the wireless device from scanning the carrier of the second access node during the future timer duration starting at the future time.

16. The system of claim 10, wherein the processing node is further configured to:
instruct the wireless device to enter a lower power mode.

17. The system of claim 10, wherein the processing node is further configured to:
send a retry parameter to the wireless device to limit a number of requests for the performance of a handover of the wireless device from the first access node to the second access node to the retry parameter based on a battery level of the wireless device.

18. The system of claim 10, wherein the processing node is further configured to:
receive in response to the rejection response a request from the wireless device for a handover prevention value; and
send the handover prevention value to the wireless device to prevent the sending of a second request for the performance of a handover of the wireless device from the first access node to the second access node.

\* \* \* \* \*